(12) United States Patent
Maksimovic et al.

(10) Patent No.: US 8,987,378 B2
(45) Date of Patent: Mar. 24, 2015

(54) COATING COMPOSITIONS COMPRISING CYCLIC CARBONATE AMINE RESINS

(71) Applicant: PPG Industries Ohio, Inc., Cleveland, OH (US)

(72) Inventors: Ljiljana Maksimovic, Allison Park, PA (US); Lawrence J. Fitzgerald, Gibsonia, PA (US); Susan Donaldson, Allison Park, PA (US); Randy E. Daughenbaugh, Monroeville, PA (US); Peter Kamarchik, Jr., Saxonburg, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 117 days.

(21) Appl. No.: 13/835,440

(22) Filed: Mar. 15, 2013

(65) Prior Publication Data

US 2014/0272434 A1    Sep. 18, 2014

(51) Int. Cl.
*C08G 77/26* (2006.01)
*C09D 183/08* (2006.01)

(52) U.S. Cl.
CPC .................................... *C09D 183/08* (2013.01)
USPC ........................... 525/100; 428/447; 525/103

(58) Field of Classification Search
USPC ................................... 525/103, 100; 428/447
See application file for complete search history.

(56) References Cited

U.S. PATENT DOCUMENTS

| 2,979,514 A | * | 4/1961 | Beavers et al. | 549/229 |
| 6,090,890 A | * | 7/2000 | Murakami et al. | 525/104 |
| 2010/0234497 A1 | * | 9/2010 | Birukov et al. | 524/108 |
| 2013/0171896 A1 | * | 7/2013 | Hanada et al. | 442/59 |
| 2014/0024274 A1 | * | 1/2014 | Hanada et al. | 442/59 |

* cited by examiner

*Primary Examiner* — Margaret Moore

(57) ABSTRACT

The present disclosure describes cyclic carbonate-amine resin coating compositions including an amino functional silicon resin component, where the cyclic carbonate-amine resin coating displays improved oxidation resistance and durability. The coating compositions are isocyanate free and may be cured a low temperatures to provide a durable coating. In specific embodiments, the described coating compositions may be used as a mono-coat on a surface of an article, without any undercoating or primer layers.

28 Claims, No Drawings

COATING COMPOSITIONS COMPRISING CYCLIC CARBONATE AMINE RESINS

FIELD OF INVENTION

The present disclosure is directed to coating compositions comprising cyclic carbonate-amine resins including a cyclic carbonate acrylate polymer component and an amino functional silicone resin. The coating compositions display improved durability and resistance to oxidation.

BACKGROUND

Curable polymeric resin materials are used for coating a variety of substrates to provide protection from mechanical damage and environmental degradation or corrosion. In many cases coating stacks including multiple different coating layers are utilized to provide different advantageous characteristics. Coating layers in these cases can include primer layers, which can act as an antioxidation coating as well as enhancing adhesion of subsequent coating layers, undercoats, and topcoats. The resulting coating stack provides a plurality of desired protective characteristics to the coated substrate including durability and resistance to environmental degradation and corrosion.

Polyurethane network polymers are a class of coating resin materials that are commonly used to coat substrates. Conventional polyurethanes are produced by reaction of polyols with isocyanates to produce isocyanate polyurethanes. However, isocyanates are generally toxic and competing side reactions during the polymerization can generate gas which can result in undesired porosity in the resulting coating layer. In addition, isocyante derived polyurethanes may have hydrolytically unstable chemical bonds rendering them susceptible to environmental degradation. Thus, efforts to produce polyurethanes without the use of isocyantes have received some attention.

One approach to nonisocyanate polyurethane network polymers includes formation of polyurethanes by reaction of cyclic carbonates with primary amines. However, processes for producing nonisocyante polyurethanes using this approach may result in resin coatings lacking durability, resistance to corrosion, yellowing upon extended exposure to UV light, and can generally require processing conditions for the preparation and curing of the polyurethane coating layers, such as high cure temperatures, that may prevent optimal utilization of this approach.

SUMMARY OF THE INVENTION

The present disclosure provides for cyclic carbonate-amine resin coating compositions that provide excellent durability and corrosion resistance.

According to a first embodiment, the present disclosure provides a cyclic carbonate-amine resin coating composition comprising a cyclic carbonate acrylate polymer component having a polymer backbone comprising 15% to 45% by weight of a monomer unit comprising a cyclic carbonate functionality, and an amino functional silicone resin component having a general formula:

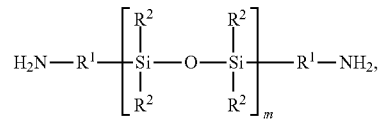

where each $R^1$ is a difunctional organic radical independently selected from an aryl, an alkyl, a dialkylaryl, an alkoxyalkyl, an alkylaminoalkyl, or a cycloalkyl radical, each $R^2$ is independently an aryl, phenyl, $(C_1-C_4)$alkyl, $(C_1-C_4)$alkoxy, or $-OSi(R^2)_2R^1NH_2$ group, and m is selected so that the amino functional silicone resin has an amine equivalent weight of 240 to 280 g/NH, and wherein the combined composition reacts to form a cross-linked cyclic carbonate-amine resin polymer.

According to another embodiment, the present disclosure provides a cyclic carbonate-amine resin coating composition comprising 15% to 60% by weight of a cyclic carbonate acrylate polymer component having a polymer backbone comprising 15% to 45% by weight of a monomer unit comprising a cyclic carbonate functionality having a structure:

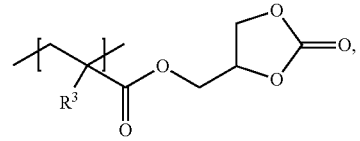

where $R^3$ is $-H$, $-CH_3$, or $-CH_2CH_3$, from 5% to 50% by weight of an amino functional silicone resin component having a general formula:

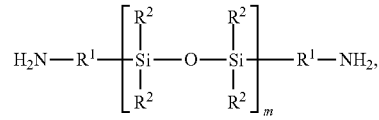

where each $R^1$ is a difunctional $(C_1-C_4)$alkyl radical and $R^2$ includes greater than 70% phenyl groups, less than 30% of $(C_1-C_4)$alkyl groups and less than 2.0% $(C_1-C_4)$alkoxy groups, and m is selected so that the amino functional silicone resin has an amine equivalent weight of 240 to 280 g/NH, from 0.0% to 5.0% by weight of a trialkoxy functional aminosilane having a general structure:

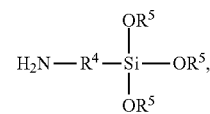

where $R^4$ is a difunctional organic radical selected from a $(C_1-C_6)$alkyl or a $(C_1-C_6)$alkylamino$(C_1-C_6)$alkyl group and each $R^5$ is independently a $(C_1-C_6)$alkyl group, and from 0.0% to 5.0% by weight of a cure accelerator comprising a bicyclic guanidine catalyst, wherein the combined composition reacts to form a cross-linked cyclic carbonate-amine resin polymer.

Still further embodiments of the present disclosure provide a coated substrate comprising at least one surface coated with a cyclic carbonate-amine resin coating according to any of the embodiments described herein.

Other embodiments of the present disclosure provide a method for preparing a cyclic carbonate-amine resin coated surface. The method comprises reacting from 15% to 60% by weight of the total coating composition, of a cyclic carbonate acrylate polymer component having a polymer backbone comprising 15% to 45% by weight of a monomer unit comprising a cyclic carbonate functionality with 5% to 50% by weight of the total coating composition of an amino functional silicone resin component having a general formula:

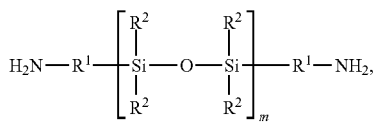

wherein each $R^1$ is a difunctional $(C_1\text{-}C_4)$alkyl radical and $R^2$ includes greater than 70% phenyl groups, less than 30% of $(C_1\text{-}C_4)$alkyl groups, and less than 2.0% $(C_1\text{-}C_4)$alkoxy groups, and in is selected so that the amino functional silicone resin has an amine equivalent weight of 240 to 280 g/NH, to form an uncured cyclic carbonate-amine resin coating composition, applying the uncured cyclic carbonate-amine resin coating composition to at least a portion of a surface of a substrate, and curing the uncured cyclic carbonate-amine resin coating composition on the substrate surface to form a cross-linked cyclic carbonate-amine resin coat.

Further embodiments of the present disclosure provide for an article comprising at least one surface coated with a coating stack comprising a cured cross-linked cyclic carbonate-amine resin polymer coating composition, wherein the cyclic carbonate-amine resin polymer coating composition comprises: a cyclic carbonate acrylate polymer component having a polymer backbone comprising 15% to 45% by weight of a monomer unit comprising a cyclic carbonate functionality; and an amino functional silicone resin component having a general formula:

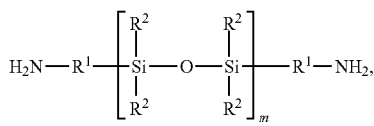

wherein each $R^1$ is a difunctional organic radical independently selected from an aryl, an alkyl, a dialkylaryl, an alkoxyalkyl, an alkylaminoalkyl, or a cycloalkyl radical, each $R^2$ is independently an aryl, phenyl, $(C_1\text{-}C_4)$alkyl, $(C_1\text{-}C_4)$alkoxy, or $-\text{OSi}(R^2)_2R^1NH_2$ group, and m is selected so that the amino functional silicone resin has an amine equivalent weight of 240 to 280 g/NH, and wherein the combined composition reacts to form the cross-linked cyclic carbonate-amine resin polymer coating after applying the uncured coating composition to the surface.

DETAILED DESCRIPTION

The present disclosure provides for cyclic carbonate-amine resin coating compositions having good or improved gloss retention, resistance to environmental degradation and oxidation and improved resistance to mechanical damage. The coating compositions provide a polyurethane coating which utilize substantially no isocyanate reactants and provide a coating having substantially no isocyante residue. Further, certain embodiments of the cyclic carbonate-amine resin coating compositions may be applied to a substrate in a one-coat coating stack which provides excellent durability and corrosion at low temperature.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of or means "and/or" unless specifically stated otherwise, even though "and/or" may be explicitly used in certain instances.

As used herein, unless otherwise expressly specified, all numbers such as those expressing values, ranges, amounts or percentages may be read as if prefaced by the word "about", even if the term does not expressly appear. As generally used herein, the term "about" refers to an acceptable degree of error for the quantity measured, given the nature or precision of the measurements. Typical exemplary degrees of error may be within 20%, 10%, or 5% of a given value or range of values. Accordingly, unless indicated to the contrary, the numerical values set forth in the following specification and claims can vary depending upon the desired properties sought to be obtained by the practice of the invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the various embodiments of the disclosure are approximations, the numerical values set forth in the specific examples are reported as precisely as possible. Any numerical value, however, inherently contains certain errors necessarily resulting from the standard variation found in their respective testing measurements.

As generally used herein, the terms "include" and "have" mean "comprising". As used herein, the term "comprising" includes the terms "consisting essentially of" and "consisting of".

In the following description, certain details are set forth to provide a thorough understanding of various embodiments of the apparatuses and/or methods described herein. However, a person having ordinary skill in the art will understand that the various embodiments described herein may be practiced without these details. In other instances, well-known structures and methods associated with the apparatuses and/or methods described herein may not be shown or described in detail to avoid unnecessarily obscuring descriptions of the embodiments described herein.

This disclosure describes various features, aspects, and advantages of various embodiments of cyclic carbonate-amine resin coating compositions as well as methods of making and using the same. It is understood, however, that this disclosure embraces numerous alternative embodiments that may be accomplished by combining any of the various features, aspects, and advantages of the various embodiments described herein in any combination or sub-combination that one of ordinary skill in the art may find useful.

Any patent, publication, or other disclosure material, in whole or in part, recited herein is incorporated by reference herein but only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The present disclosure provides compositions and methods directed to cyclic carbonate-amine resin coating systems that provide improved durability and protect the coated substrate from undesired oxidation. In certain embodiments, the coating compositions may be utilized in a single coat process that provides protection against mechanical damage and environmental degradation. The cyclic carbonate-amine resin coating compositions demonstrate good corrosion properties when coated directly on metal and cured. In addition, the coatings possess good QUV-A durability and gloss retention. According to certain embodiments coating compositions may be cured at elevated temperatures to provide a cross-linked cyclic carbonate-amine resin polymer. According to other embodiments, the coating compositions may be cured in the presence of a curing catalyst at low temperatures, such as room temperatures, to provide a cross-linked cyclic carbonate-amine resin polymer.

According to one embodiment, the present disclosure provides a cyclic carbonate-amine resin coating composition comprising a cyclic carbonate acrylate polymer component having a polymer backbone comprising from 15% to 45% by weight of a monomer unit comprising a cyclic carbonate functionality; and an amino functional silicone resin component, wherein the combined composition reacts to form a cross-linked cyclic carbonate-amine resin polymer upon curing. The resulting cross-linked cyclic carbonate-amine resin polymer may be used as a polyurethane based coating formulation being substantially free of isocyanate residues. As used herein, the term "substantially free" means having no added isocyanate containing reactants or residue from added isocyanate in the resulting urethane composition, such as less than 0.1% by weight, 0.01% by weight, or even less than 0.001% by weight of isocyanate residues.

According to certain embodiments, the cyclic carbonate acrylate polymer component may comprise a copolymer of residues of acrylate monomers having a carbonate moiety along with residues of one or more other vinyl monomers, such as but not limited to acrylate monomers, substituted vinyl monomers, or styrenyl monomers. As used herein, the term "acrylate monomer" includes monomers having a structure $CH_2=CR^6COOR^7$, where $R^6$ may be —H or a linear or branched, aliphatic $(C_1-C_6)$alkyl group and $R^7$ may be a linear or branched, aliphatic $(C_1-C_6)$alkyl group, an epoxide containing group, or a carbonate containing group. According to specific embodiment, the one or more other vinyl monomers may include butyl methacrylate, methyl methacrylate, styrene, methyl acrylate, butyl acrylate or 2-ethyl hexyl acrylate.

According to various embodiments the copolymer backbone of the cyclic carbonate acrylate polymer may comprise from 15% to 45% of monomer units comprising a cyclic carbonate functionality. Examples of suitable cyclic carbonate functionality structures include terminal cyclic carbonates having a structure comprising a 5- or 6-membered cyclic carbonate structure, such as

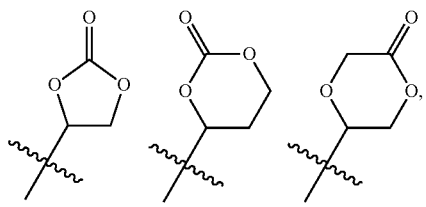

which may be optionally substituted with one or more alkyl groups. In specific embodiments, the cyclic carbonate structure may be a 5-membered cyclic carbonate. According to certain embodiments the cyclic carbonate acrylate polymer component may comprise cyclic carbonate monomer units having the structure according to Formula 1:

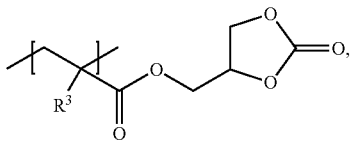

Formula 1 where $R^3$ may be —H, —$CH_3$, or —$CH_2CH_3$ or even $(C_3-C_{10})$ straight chain or branched alkyl. In particular embodiments, $R^3$ may be —H or —$CH_3$. In certain embodiments, $R^3$ may be —$CH_3$.

In certain embodiments, the cyclic carbonate acrylate polymer may be synthesized using monomer units comprising a cyclic carbonate acrylate structure, such as $CH_2=C(R^3)-C(=O)-O-(CH_2)_n-B$, where B is a 5- or 6-membered cyclic carbonate structure, as described herein, $R^3$ may be as described herein, and n is an integer having a value of from 1 and 10. According to specific embodiments, the monomer unit may comprise a 5-membered cyclic carbonate, n is 1 and $R^3$ may be —H or —$CH_3$. In specific embodiments, $R^3$ may be —$CH_3$.

According to other embodiments, the cyclic carbonate functionality of the polymer may be installed after polymerization of the polymer backbone. For example, in one embodiment, the polymer may include polymerization of monomers comprising epoxy functionality, such as an epoxy-acrylate monomer, for example a glycidyl acrylate or glycidyl methacrylate ("GMA"), where the epoxide functional group is on a side chain off of the polymer main chain and where the epoxide group is later converted to a cyclic carbonate functional group. For example, according to certain embodiments, the epoxide group may be converted to a 5-membered cyclic carbonate by reacting the epoxide group with $CO_2$ in the presence of a catalyst. In one embodiment, the catalyst may be tributylammonium iodide ("TBAI"), however, the inventors have discovered that TBAI may result in undesired yellowing of the resulting polymer, particularly upon exposure to UV light or upon aging under environmental conditions. According to other embodiments, the catalyst may be tributylammonium bromide ("TBAB"). The inventors have surprisingly discovered that using TBAB as a catalyst to convert the polymeric epoxide side chain to a cyclic carbonate results in a polymer composition that does not display yellowing upon exposure to UV light or upon aging. According to specific embodiments of the coating compositions described herein, the cyclic carbonate monomer unit may be formed from a glycidyl(meth)acrylate monomer unit in the polymer chain. According to these embodiments, the epoxide functional group of the glycidyl(meth)acrylate monomer unit may be reacted in the presence of $CO_2$ and either TBAI or TBAB catalyst. In certain embodiments, the cyclic carbonate monomer unit is formed form a glycidyl(meth)acrylate monomer unit by reacting a glycidyl(meth)acrylate copolymer in the presence of $CO_2$ and from 0.5 to 3.0% by weight of TBAB. According to various embodiments where TBAB is utilized as the catalyst, the resulting coating composition does not display yellowing upon exposure, such as prolonged exposure to UV light, or upon aging under environmental conditions. One of skill in the art would understand that other chemical methods and reactions for converting epoxide groups to cyclic carbonate groups may be suited for use herein and are intended to be within the scope of the present disclosure In one embodiment, the cyclic carbonate acrylate polymer component may be formed by copolymerizing GMA with one or more other vinyl, styrenyl, or acrylate polymer to form a copolymer having between 15% and 45% of monomer residues having a glycidyl side chain off the polymer backbone. The glycidyl side chain may then be reacted with $CO_2$ in the presence of from 0.5% to 3.0% of a TBAB catalyst to convert the epoxide moiety of the glycidyl side chain to a cyclic carbonate such that the monomer residue has the structure according to Formula 1A.

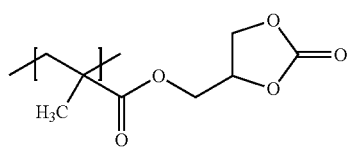

Formula 1A

According to these embodiments, the resulting cyclic carbonate acrylate polymer component may have a polymer backbone comprising form 15% to 45% by weight of the monomer residue of Formula 1A.

With reference to the amino functional silicone resin component of the cyclic carbonate-amine resin coating composition, according to various embodiments, the amino functional silicone resin component may have a structure according to Formula 2:

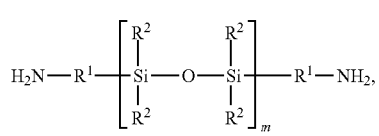

Formula 2 wherein each $R^1$ is a difunctional organic radical independently selected from an aryl, an alkyl, a dialkylaryl, an alkoxyalkyl, an alkylaminoalkyl, or a cycloalkyl radical, each $R^1$ is independently an aryl, phenyl, $(C_1\text{-}C_4)$alkyl, $(C_1\text{-}C_4)$ alkoxy, or $-OSi(R^1)_2R^1NH$, group, and in is selected so that the amino functional silicone resin has an amine equivalent weight ranging from 240 to 280 g/NH.

According to one embodiment, the amino functional polysiloxane resin may be SILRES® HP2000 ("HP2000"), an amino functional methyl phenyl silicone resin, having an amine equivalent weight of 230-255 grams/NH, commercially available from Wacker Chemical Corporation, Adrian, Mich. In particular embodiments, the amino functional polysiloxane resin may be DOW CORNING® 3055 Resin ("DC3055"), a flexible amino-functional phenyl methyl silicone resin (CAS No. 1242619-23-3), having an amine equivalent of 250-270 grams/NH, commercially available from Dow Corning Corp., Midland, Mich. Other commercially available or proprietary amino functional polysiloxane resins having methyl and phenyl substitution at $R_9$ may also be suited for various embodiments of the cure system. In particular embodiments, the at least one amino functional polysiloxane resin may have a structure where $R_9$ includes greater than 70% of phenyl group substitution, less than 30% $(C_1\text{-}C_4)$alkyl group substitution and less than 2.0% $(C_1\text{-}C_4)$ alkoxy group substitution and in specific embodiments, less than 0.5% of $(C_1\text{-}C_4)$alkoxy group substitution. In particular embodiments, the at least one amino functional polysiloxane resin may be an amino functional phenyl methyl polysiloxane resin, such as, but not limited to DOW CORNING® 3055. In specific embodiments, the late least one amino functional polysiloxane resin may have an amine equivalent weight of 230 to 280 g/NH, and in other embodiments from 240 to 280 g/NH, and even 250 to 270 g/NH. According to other embodiments, blends of amino functional silicone resins may be used. For example, in various embodiments blends of DC3055 and HP2000 may be used as the amino functional silicone resin component of the cyclic carbonate-amine resin formulation described herein. The blends of DC3055 and HP2000 may comprise from 5% to 95% by weight of the DC3055 and from 95% to 5% by weight of the HP2000.

In still other embodiments, the amino functional silicone resin, including blends thereof, may be blended with one or more additional amines or diamine compounds. The amino functional silicon resin component may be blended with other diamines or polyamines and reacted to provide cyclic carbonate-amine resin coatings that coating display properties desired by the end user. Other diamines that are suitable for blending with the amino functional silicone resin include diamines common in the coating arts, including but not limited to linear or branched alkyldiamines $(H_2N-(C_1\text{-}C_{20})$ alkyl-$NH_2)$; cycloaliphatic diamines, including for example isophoronediamine, etc.; polyamines, such as polyetheramines, for example JEFFAMINE® polyetheramines (commercially available from Huntsman Corp, The Woodlands, Tex.); and the like.

The cyclic carbonate acrylate polymer component and the amino functional silicone resin component may be combined together to form the cyclic carbonate-amine resin coating composition where the combined composition may be applied to a surface to be coated and then cured to form a cross-linked cyclic carbonate-amine resin polymer coating. The resulting coating displays improved characteristics over conventional cyclic carbonate-amine resin coatings or other urethane coatings, for example but not limited to increased durability, increased resistance to oxidation of coating or the underlying coated surface. In specific embodiments, the coating composition may comprise 15% to 60% by weight of the cyclic carbonate acrylate polymer component and 5% to 50% by weight of the amino functional silicone resin component. According to other embodiments, the coating composition may comprise 25% to 50% by weight of the cyclic carbonate acrylate polymer component and 15% to 40% by weight of the amino functional silicone resin component.

According to various embodiments of the cyclic carbonate acrylate amine coating composition, the cyclic carbonate acrylate polymer component may react with the amino functional silicone resin component to form a hydroxy urethane functionality as shown in the reaction Equation 1. There may be two possible coupling products having either a primary alcohol or a secondary alcohol, depending for example on the reactivity of the cyclic carbonate and the amino functionality. Because the amino functional silicone resin, as described herein comprises at least two amino functional groups, one amino functionality on the amino functional polysiloxane may react with one cyclic carbonate functionality on one polymer chain and the other amino functionality may react with a second cyclic carbonate functionality either on the same polymer chain or on a neighboring polymer chain to form a cross-linked polymer network. As used herein, the term "cyclic carbonate-amine resin" means the polymeric urethane reaction product produced when a cyclic carbonate containing polymer component reacts with an amine component. It will be understood that the cyclic carbonate-amine resin may comprise additional components in addition to the polymeric urethane product.

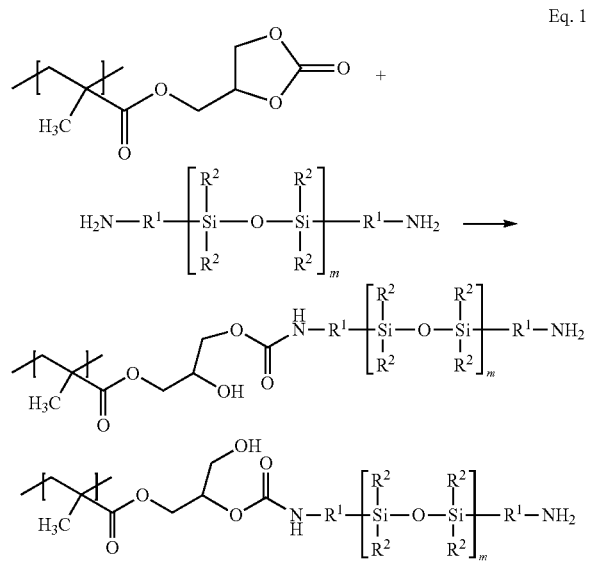

Eq. 1

As the cross-link hydroxy urethane polymer network forms, the cyclic carbonate-amine resin cures to form a cross-linked cyclic carbonate-amine resin polymer. According to various embodiments, the composition comprising the cyclic carbonate acrylate component and the amino functional silicone resin may be applied to at least one surface of an article to form a coated surface, which is then cured to form a cross-linked resin polymer coating on the surface where the coating exhibits high durability and resistance to oxidation of the coating and underlying surface. In certain embodiments, the coating may also exhibit reduced susceptibility to yellowing upon aging or prolonged exposure to UV light or other environmental weathering.

Further advantages of the coating resins of the present disclosure include that the cyclic carbonate-amine resin coating composition is a urethane coating composition that is substantially free of isocyanate residues or compounds. Conventional urethane coating compositions may be formed by reacting isocyanates, such as diisocyanate compounds, with alcohol functional groups to form polymers having urethane structures in at least one of the polymer backbone or cross-linking structures. Isocyanates are generally toxic and require methods for their safe handling and disposal. Further, polyurethanes produced using isocyanates may have residual, unreacted isocyanate compounds or functionality in the polymer composition which can leach from the polymer or react with other functionality to form undesired side products. The hydroxy urethane-based cyclic carbonate-amine resin coating compositions provide a urethane-based, cross-linked structure that does not utilize isocyanate raw materials during manufacturing and therefore provides a product that is substantially free of isocyanate residues.

According to various aspects, the present cyclic carbonate-amine resin coating composition may be cured to provide a hardened cross-linked cyclic carbonate-amineresin polymer coating on the surface. As described herein, curing of the cyclic carbonate-amine resin coating comprises reaction of amino functionality on the amine functional silicone resin component with cyclic carbonate functionality on the cyclic carbonate acrylate polymer component to form cross-links between polymer chains of the cyclic carbonate acrylate polymer component. According to various embodiments, curing the cyclic carbonate-amine resin coating may be performed thermally or by catalysis. According to certain aspects, curing the cyclic carbonate-amine resin coating may be performed by thermally heating the coating, for example by heating the coated substrate after application of the uncured coating composition. Heating the coating may comprise heating the coating at a temperature of 25° C. to 150° C., or at a temperature of 50° C. to 120° C., or at a temperature of 70° C. to 100° C. for a time of 10 minutes to 10 hours. According to other embodiments, the curing of the cyclic carbonate-amine resin coating may be catalyzed by a curing catalyst or cure accelerator that promotes reaction between the amino functionality on the amine functional silicone resin component and the cyclic carbonate functionality on the cyclic carbonate acrylate polymer component. Suitable catalysts or cure accelerators for curing the coating compositions include, for example, basic guanidine catalysts, such as cyclic guanidine catalysts and bicyclic guanidine ("BCG") catalysts, including salts thereof. Suitable BCG catalysts include those described in U.S. Publication 2012/02772770 A1, but are not limited to BCGs having a structure according to Formula 3 where each n is independently 1-3, such as 1,5,7-triazabicyclo[4.4.0]dec-5-ene ("TBD", also called 1,3,4,5,7,8-2H-pyrimido[1,2a]pyrimidine), 1,4,6-triazabicyclo[3.3.0]oct-4-ene ("TBO"), including salts of the BCGs and BCGs having ring substitution at the carbons of the two rings.

Formula 3

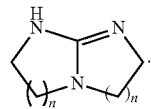

In certain embodiments, the BCG may have a structure of TBD, i.e., where a is 2. According to various embodiments, the cyclic carbonate-amine resin coating composition may further comprise up to 5.0% by weight of a cure accelerator comprising a bicyclic guanidine catalyst or salt thereof, for example, from 0.0% to 5M % of the BCG catalyst, from 0.1% to 5.0% of the BCG catalyst, or even from 0.1% to 1.5% of the BCG catalyst. Since the BCG is used as a catalyst, one of skill in the art would understand that greater amounts of catalyst may be used, but are not necessary and/or economically feasible. The cure accelerator, such as the BCG catalyst, allows for rapid curing of the cyclic carbonate-amine resin coating composition under mild conditions. For example, in certain embodiments, the presence of the cure accelerator in the composition allows for curing of the coating compositions at temperatures of 0° C. to 50° C. or even from 10° C. to 30° C., and in particular embodiments, from 20° C. to 30° C., or curing at room temperature or ambient temperature. According to certain embodiments, curing of the coating composition comprising the cure accelerator, such as a BCG catalyst, may be performed at approximately room temperature. According to these embodiments, curing that coating composition comprising the cure accelerator may comprise curing for 1 days to 10 days at ambient temperature, or until the coating composition displays the desired durability and/or oxidation resistance. According to certain aspects, curing the coating composition comprising the cure accelerator, such as a BCG catalyst, at the low temperatures described herein allows for curing of the coating without requiring heating of the coating composition. This allows for curing the coating composition on site, for example at a location where the substrate to be coated is located, as well as a production or coating facility. Alternatively, in other embodiments, curing the coating composition comprising the cure accelerator, such as a BCG catalyst, can be accomplished thermally at temperatures of 50° C. to 150° C. or other thermal temperatures for thermal cures described herein.

According to certain embodiments, the cyclic carbonate acrylate amine coating composition may further comprise one or more additional functional aminosilanes. For example, in specific embodiments, the coating composition may further comprise a trialkoxy functional aminosilane. According to these embodiments, the trialkoxy functional aminosilane may have a general structure according to Formula 4.

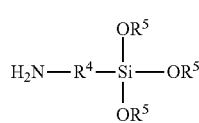

Formula 4 where $R^4$ may be a difunctional organic radical selected from an aryl, an alkyl, a dialkylaryl, an alkoxyalkyl, an alkylaminoalkyl, or a cycloalkyl radical containing up to 6 carbon atoms, and each $R^5$ may be independently an alkyl, hydroxyalkyl, alkoxyalkyl or hydroxyalkoxy alkyl group wherein each alkyl, aryl, cycloalkyl, and alkoxy group in the $R^5$ groups contains up to 6 carbon atoms. According to specific embodiments, each $R^5$ group may be independently chosen from an $(C_1-C_6)$alkyl group and $R^4$ may be a $(C_1-C_6)$alkyl groups or a $(C_1-C_6)$ alkylamino$(C_1-C_6)$alkyl group. Suitable trialkoxy functional aminosilanes may include aminopropyltrimethoxysilane, aminopropyltriethoxysilane, aminopropyltripropoxysilane, aminoneohexyltrimethoxysilane, N-β-(aminoethyl)-γ-aminopropyltrimethoxysilane, N-β-(aminoethyl)-γ-aminopropyltriethoxysilane, N-phenylaminopropyl trimethoxysilane, trimethoxysilylpropyl diethylene triamine, 3-(3-aminophenoxy)propyl trimethoxysilane, aminoethyl aminomethyl phenyl trimethoxysilane, 2-aminoethyl-3-aminopropyl-tris-2-ethylhexoxysilane, N-aminohexyl aminopropyl trimethoxysilane, and/or trisaminopropyl trismethoxy ethoxy silane. Examples of suitable commercially available trialkoxy functional aminosilanes include SILQUEST® A-1100 (aminopropyltrimethoxysilane having an amine equivalent weight of 89.7), SILQUEST® A-1110 (aminopropyltriethoxysilane having an amine equivalent weight of 111), SILQUEST® A-1120 (N-beta-(aminoethyl)-gamma-aminopropyltrimethoxysilane), and SILQUEST® A-1637, commercially available from Crompton OSi Specialties, South Charleston, W. Va. Other suitable trialkoxy functional aminosilanes include those set forth in U.S. Pat. No. 7,459,515 at column 10, lines 38-65, incorporated herein by this reference. In specific embodiments, the trialkoxy functional aminosilane may be aminopropyltrimethoxysilane or aminopropyltriethoxysilane.

In specific embodiments of the coating composition, the composition may comprise up to 5.0% by weight of the trialkoxy functional aminosilane, for example 0.0% to 5.0% by weight of the trialkoxy functional aminosilane, 0.1% to 5.0% by weight of the trialkoxy functional aminosilane, or even 1.0% to 2.0% by weight of the trialkoxy functional aminosilane. According to various embodiments of the coating composition further comprising a trialkoxy functional aminosilane, the resulting coating composition may further display increased durability and hardness, for example, in those situations where additional durability is desired. Without intending to be limited by any proposed reaction mechanism, it is believed that the trialkoxy functional aminosilane may react with the alcohol of the hydroxy urethane structure (see Eq. 1), potentially in the presence of residual or added water, to prevent reformation of the cyclic carbonate structure and concomitant reduction of the number of cross-links.

According to various embodiments, the coating compositions may comprise one or more other components, including but not limited to, including corrosion inhibitors, moisture scavengers, pigments, aggregates, rheological modifiers, plasticizers, antifoam agents, adhesion promoters, suspending agents, thixotropic agents, catalysts, pigment wetting agents, bituminous and asphaltic extenders, antisettling agents, leveling agents, diluents, HALS light stabilizer, UV light stabilizers, air release agents, silicone additives, dispersing aids, solvents, surfactants, or mixtures of any thereof. One of ordinary skill in the resin coating compositions art would understand that other common components may be incorporated into the coating composition within the scope of the various embodiments of the disclosures described herein. In specific embodiments, the cyclic carbonate-amine resin coating composition may comprise up to 20% by weight of such components.

In specific embodiments, the coating composition may comprise one or more additive selected from a silicone additive. Silicone additives that may be included in the coating compositions may include, but are not limited to, polyether modified polydimethylsiloxane additives, such as BYK-333, naphtha based silicone additives, such as BYK-088, and polyacrylate silicone additives, such as BYK-361N (commercially available from BYK USA Inc., Wallingford, Conn.).

In certain embodiments, the coating composition may additionally comprise one or more corrosion inhibitors. Examples of suitable corrosion inhibitors include, but are not limited to, zinc phosphate based corrosion inhibitors, for example, micronized, HALOX® SZP-391, HALOX® 430 calcium phosphate, HALOX® ZP zinc phosphate, HALOX® SW-111 strontium phosphosilicate, HALOX® 720 mixed metal phosphor-carbonate, and HALOX® 550 and 650 proprietary organic corrosion inhibitors commercially available from Halox, Hammond, Ind. Other suitable corrosion inhibitors may include HEUCOPHOS® ZPA zinc aluminum phosphate and HEUCOPHOS® ZMP zinc molybdenum phosphate, commercially available from Heucotech Ltd, Fairless Hills, Pa. Corrosion inhibitors may be included into the coating composition in amounts ranging from about 1% to about 7% by weight. Various embodiments of the coating composition may additionally comprise one or more light stabilizers, such as liquid hindered amine light stabilizers ("HALS") or UV light stabilizers. Examples of suitable HALS include, for example, TINUVIN® HALS compounds such as TINUVIN® 293, TINUVIN® 292, TINUVIN® 123, TINUVIN® 622, TINUVIN® 783, TINUVIN® 770 commercially available from BASF, Ludwigshafen, Germany. Examples of suitable UV light stabilizers include, for example, CYASORB® light stabilizers, such as CYASORB® UV-1164L (2,4-bis(2, 4-dimethylphenyl)-6-(2-hydroxy-4-isooctyloxyphenyl)-1,3, 5-triazine), commercially available from Cytec Industries, Woodland Park, N.J. and TINUVIN® 384-2, TINUVIN® 1130 and TINUVIN® 328 commercially available from BASF, Ludwigshafen, Germany. The one or more light stabilizer may be included into the coating composition in amounts ranging from 0.25% to 4.0% by weight.

Suitable pigments for certain embodiments of the coating compositions may be selected from organic or inorganic color pigments and may include, for example, titanium dioxide, carbon black, lampblack, zinc oxide, natural and synthetic red, yellow, brown and black iron oxides, toluidine and benzidine yellow, phthalocyanine blue and green, Naphthol red, Quindo violet, and carbazole violet, and extender pigments including ground and crystalline silica, barium sulfate, magnesium silicate, calcium silicate, mica, micaceous iron oxide, calcium carbonate, zinc powder, aluminum and aluminum silicate, gypsum, feldspar, bentonite clay (such as Bentone SD®-1) and the like. The amount of pigment that may be used to firm the composition is understood to vary, depending on the particular composition application, and can be zero when a clear composition is desired. In various embodiments, the cyclic carbonate-amine resin coating composition may comprise up to 50 percent by weight fine particle size pigment and/or aggregate. In some embodiments, using greater than 50 percent by weight fine particle size pigment and/or aggregate ingredient may produce a composition that can be too viscous for application. In certain compositions where it is desirable to have more than 50% pigment or aggregate in the final composition, such as a zinc rich primer which contains up to 90% zinc in the dry film or flooring composition which may contain up to 80% pigment/aggregate, the pigment or aggregate may be packaged separately as a third component. Depending on the particular end use, certain embodiments of the coating compositions may comprise from 5% to 35% by weight fine particle size aggregate and/or pigment.

The pigment and/or aggregate ingredient may typically be added to the cyclic carbonate acrylate polymer component of the resin coating, for example, by dispersing with a Cowles mixer to at least 3 Hegman fineness of grind, or alternatively may be ball milled or sand milled to the same fineness of grind before addition to the cyclic carbonate ingredient, In certain embodiments, selection of a fine particle size pigment or aggregate and dispersion or milling to about 3 Hegman grind allows for the atomization of mixed resin and cure components with conventional air, air-assisted airless, airless and electrostatic spray equipment, and may provide a smooth, uniform surface appearance after application.

Various embodiments of the cyclic carbonate-amine resin coating compositions of this disclosure may be formulated for application with conventional air, airless, air-assisted airless and electrostatic spray equipment, brush, or roller, Certain embodiments of the compositions may be used as protective coatings for steel, galvanizing, aluminum, concrete, polymeric surfaces, fiberglass, and other substrates at dry film thicknesses in the range of from 25 micrometers to 3 millimeters, for example from 1.2 to 2.5 mils. Accordingly, pigment or aggregate ingredients useful in forming the composition of the present disclosure may be selected from a fine particle size material, for example but not limited to, having at least 90 weight % greater than 325 mesh U.S. sieve size.

In various embodiments, the present coating composition may comprise water and the water may be present in an amount sufficient to bring about both the hydrolysis and condensation of the silanols such as the trialkoxy functional aminosilane. Non-limiting sources of water may include atmospheric humidity and adsorbed moisture on the pigment or aggregate material. Additional water may be added, for example, to accelerate cure depending on ambient conditions, such as the use of the coating and flooring composition in arid environments. Certain embodiments of the cyclic carbonate-amine resin coating composition may comprise up to a stoichiometric amount of water to facilitate hydrolysis. Compositions that are prepared without added water may not contain the amount of moisture needed for the hydrolysis and condensation reactions, and may therefore produce a composition product having an insufficient degree of ultraviolet, corrosion and chemical resistance. In specific embodiments, the cyclic carbonate-amine resin coating composition may be prepared using less than or equal to approximately 1% by weight water.

If desired, water may be added to the cyclic carbonate-amine resin coating resin. Other sources of water may include trace amounts present in the cyclic carbonate acrylate resin, the amino functional polysiloxane system, thinning solvent, or other ingredients, or may be produced during condensation of the amino functional silicon resin with the cyclic carbonate. Regardless of its source, the total amount of water used should be the stoichiometric amount needed to facilitate the hydrolysis reaction. Water exceeding the stoichiometric amount may be undesirable since excess water may act to reduce the surface gloss of the finally-cured composition product.

According to various embodiments, the cyclic carbonate-amine resin coating composition may be made by mixing a cyclic carbonate acrylate polymer component with, an amino functional silicone resin. For example, one embodiment of the preparation of the coating composition may comprise preparing a cyclic carbonate acrylate polymer grind component which may comprise the cyclic carbonate acrylate resin along with one or more of the following, surfactants, de-aeration additives, silicone additives, pigments, and solvent. The components of the cyclic carbonate acrylate polymer component may be admixed together and mixed at a rate to avoid agglomeration and form the grind. Preparing the cyclic carbonate-amine resin coating composition may comprise mixing the cyclic carbonate acrylate polymer component with the amino functional silicone resin, along with other additives, such as light stabilizers, additional cyclic carbonate acrylate polymer, and silicone additives, until a uniform coating composition suitable for coating surfaces is obtained.

According to specific embodiments, the present disclosure provides a cyclic carbonate-amine resin coating composition. The coating composition may comprise 15% to 60% by weight of a cyclic carbonate acrylate polymer component having a polymer backbone comprising 15% to 45% by weight of a monomer unit comprising a cyclic carbonate functionality having the structure according to Formula 1:

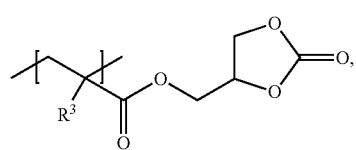

where $R^3$ is H, $CH_3$, or $CH_2CH_3$; from 5.0% to 50% by weight of an amino functional silicone resin component having a general structure according to Formula 2:

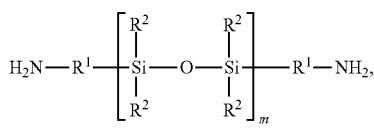

wherein each $R^1$ is a difunctional $(C_1\text{-}C_4)$alkyl radical and $R^2$ includes greater than 70% phenyl groups, less than 30% of $(C_1\text{-}C_4)$alkyl, groups, and less than 2.0% $(C_1\text{-}C_4)$alkoxy groups, and in is selected so that the amino functional silicone resin has an amine equivalent weight of 240 to 280 g/NH; from 0.0% to 5.0% by weight of a trialkoxy functional aminosilane having a general structure according to Formula 3:

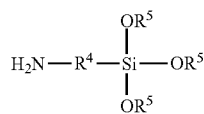

where $R^4$ is a difunctional organic radical selected from a $(C_1\text{-}C_6)$alkyl or a $(C_1\text{-}C_6)$alkylamino $(C_1\text{-}C_6)$alkyl group and each $R^5$ is independently a $(C_1\text{-}C_6)$alkyl group; and from 0.0% to 5.0% by weight of a cure accelerator comprising a bicyclic guanidine catalyst, wherein the combined composition reacts to form a cross-linked cyclic carbonate-amine resin polymer. In specific embodiments, the coating composition may further comprise less than 20% by weight of one or more other components, including but not limited to, including corrosion inhibitors, moisture scavengers, pigments, aggregates, rheological modifiers, plasticizers, antifoam agents, adhesion promoters, suspending agents, thixotropic agents, catalysts, pigment wetting agents, bituminous and asphaltic extenders, antisettling agents, leveling agents, diluents, HALS light stabilizer, UV light stabilizers, air release agents, silicone additives, dispersing aids, solvents, surfactants, or mixtures of any thereof.

In specific embodiments, the cyclic carbonate monomer unit of the cyclic carbonate acrylate polymer may be formed from a glycidyl(meth)acrylate copolymer by reacting a glycidyl(meth)acrylate monomer residue in the copolymer in the presence of $CO_2$ and 0.5% to 3.0% by weight of a TBAB catalyst to convert the epoxide functional group of the glycidyl side chain into a cyclic carbonate side chain as shown in Formula 1.

According to various embodiments of the coating compositions described herein, the coating compositions display one or more of improved durability and hardness, improved corrosion resistance, and reduced yellowing compared to conventional cyclic carbonate-amine resin coating compositions. For example, according to specific embodiments, coatings, such as single coats, using the cyclic carbonate-amine resin coating compositions of the present disclosure does not display yellowing upon prolonged exposure to UV light and/or environmental weathering. Coating formulations of the present cyclic carbonate-amine resins display no yellowing under accelerated weathering, with delta b ($\Delta b$) values of less that or equal to 0, even after 2000 hr or up to 5000 hr of weathering under ASTM G155-5A (SAEJ2527). In other embodiments, coatings, such as single coats, using the cyclic carbonate-amine resin coating compositions of the present disclosure displays reduced fading or loss of gloss over prolonged exposure to UV lights and/or environmental weathering. Coating formulations of the present cyclic carbonate-amine resins display reduced fading under accelerated weathering, with delta E ($\Delta E$) values of less that 5, even after 2000 hr or up to 5000 hr of weathering under ASTM G155-5A SAEJ2527.

Still further embodiments of the present disclosure are directed to a coated substrate comprising at least one surface that has been coated with a cyclic carbonate-amine resin coating composition according to any of the various embodiments described herein. According to certain embodiments, the coating composition may be applied to the substrate as a top coat, for example to protect the surface from weathering, corrosion and environmental damage, and/or mechanical damage. In specific embodiments, the cyclic carbonate-amine resin coating composition may be applied to the surface as a topcoat over one or more undercoats, such as a primer coating. According to the various embodiments, the cyclic carbonate-amine resin coating composition may comprise one or more coating layers over the coating composition the cyclic carbonate-amine resin coat may be an undercoat in a coating stack). According to other embodiments, the cyclic carbonate-amine resin coating composition may be applied to the surface as a topcoat applied directly to the surface as a one-coat coating stack, i.e., where the substrate surface does not have a primer coating or other undercoating beneath the cyclic carbonate-amine resin coating composition top coat.

Examples of coated substrates may include articles of manufacture. According to specific embodiments, the present disclosure provides for an article comprising at least one surface coated with a coating stack comprising a cured cross-linked cyclic carbonate-amine resin polymer coating composition, wherein the cyclic carbonate-amine resin polymer coating composition comprises: a cyclic carbonate acrylate polymer component having a polymer backbone comprising from 15% to 45% by weight of a monomer unit comprising a cyclic carbonate functionality; and an amino functional silicone resin component having a general structure according to Formula 2:

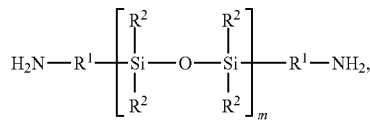

wherein each may be a difunctional organic radical independently selected from an aryl, alkyl, a dialkylaryl, an alkoxyalkyl, an alkylaminoalkyl, or a cycloalkyl radical, each $R^2$ may independently be an aryl, phenyl, $(C_1\text{-}C_4)$alkyl, $(C_1\text{-}C_4)$alkoxy, or $-OSi(R^2)_2R^1NH_2$ group, and in is selected so that the amino functional silicone resin has an amine equivalent weight of 240 to 280 OH, and wherein the combined composition reacts to form the cross-linked cyclic carbonate-amine resin polymer coating after applying the uncured coating composition to the surface. According to specific embodiments, the amino functional silicone resin component may comprise a structure where each $R^1$ may be a difunctional $(C_1\text{-}C_4)$alkyl radical and $R^2$ may include greater than 70% phenyl groups, less than 30% of $(C_1\text{-}C_4)$alkyl groups, and less than 2.0% $(C_1\text{-}C_4)$alkoxy groups, and m is selected so that the amino functional silicone resin has an amine equivalent weight of 240 to 280 g/NH, to form an uncured cyclic carbonate-amine resin coating composition. As detailed above, in specific embodiments the coating stack may not include any undercoat or primer coating, such as wherein the cyclic carbonate amine coating resin is a single layer coating stack.

According to other embodiments of the coated article, the cyclic carbonate amine coating resin polymer coating composition may further comprise from 0.0% to 5.0% by weight of a trialkoxy functional aminosilane having a structure according to Formula 3:

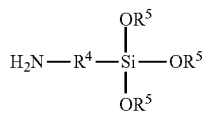

where $R^4$ may be a difunctional organic radical selected from a $(C_1-C_6)$alkyl or a $(C_1-C_6)$alkylamino$(C_1-C_6)$alkyl group and each R' may independently be a $(C_1-C_6)$alkyl group. In specific embodiments of the trialkoxy functional aminosilane, $R^4$ may be $(C_1-C_6)$alkyl and each $R^5$ may be methoxy or ethoxy.

Other embodiments of the present disclosure provide for methods of preparing a cyclic carbonate-amine resin coated surface. According to certain embodiments, the methods may comprise reacting from 15% to 60% by weight of the total coating composition, of a cyclic carbonate acrylate polymer component having a polymer backbone comprising from 15% to 45% by weight of a monomer unit comprising a cyclic carbonate functionality with from 5% to 50% by weight of the total coating composition of an amino functional silicone resin component having a general structure according to Formula 2:

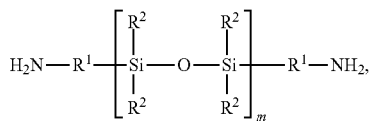

wherein each $R^1$ is a difunctional $(C_1-C_4)$alkyl radical and $R^2$ includes greater than 70% phenyl groups, less than 30% of $(C_1-C_4)$alkyl groups, and less than 2.0% $(C_1-C_4)$alkoxy groups, and m is selected so that the amino functional silicone resin has an amine equivalent weight of 240 to 280 g/NH, to form an uncured cyclic carbonate-amine resin coating composition; applying the uncured cyclic carbonate-amine resin coating composition to at least a portion of a surface of a substrate; and curing the uncured cyclic carbonate-amine resin coating composition on the substrate surface to form a cross-linked cyclic carbonate-amine resin coat.

According to various embodiments, curing the uncured cyclic carbonate-amine resin coating composition may comprise heating the uncured cyclic carbonate-amine resin coating composition at a temperature of 25° C. to 150° C., or at a temperature of 50° C. to 120° C., or at a temperature of 70° C. to 100° C. for a time of from 10 minutes to 10 hours. According to other embodiments, curing the uncured cyclic carbonate-amine resin coating composition may comprise adding 0.0% to 5.0% by weight of a cure accelerator, such as, any of the cure accelerators described herein, for example a BCG catalyst, to the uncured cyclic carbonate-amine resin coating composition and allowing the coating composition to cure at a temperature of 0° C. to 50° C. or even from 10° C. to 30° C., and in particular embodiments, from 20° C. to 30° C., or curing at room temperature or ambient temperature.

According to further embodiments of the method, applying the uncured coating composition to at least a portion of a surface of a substrate may comprise applying the coating composition to the substrate as a top coat, for example to protect the surface from weathering, corrosion and environmental damage, and/or mechanical damage. In specific embodiments, applying the uncured cyclic carbonate-amine resin coating composition to the surface may comprise applying the resin coating composition as a topcoat over one or more undercoats, such as a primer coating. According to other embodiments, applying the uncured cyclic carbonate-amine resin coating composition to the surface may comprise applying the resin coating composition directly to the surface as a one-coat coating stack, i.e., where the substrate surface does not have a primer coating or other undercoating beneath the cyclic carbonate-amine resin coating composition top coat. According to the various embodiments, the method may further comprise applying one or more coating layers over the cured cyclic carbonate-amine resin coating composition (i.e., the cyclic carbonate-amine resin coat may be an undercoat in a coating stack). According to the various embodiments, the methods do not comprise adding an isocyanate containing group such that the resulting cyclic carbonate-amine resin coating composition comprises substantially no isocyanate or isocyanate residues.

According to other embodiments, the method may further comprise reacting copolymer resin comprising a glycidyl (meth)acrylate monomer units with $CO_2$ in the presence of from 0.5% to 3.0% by weight of a TBAB catalyst to form the cyclic carbonate acrylate polymer component having a polymer backbone comprising from 15% to 45% by weight of a monomer unit comprising a cyclic carbonate functionality.

In specific embodiment, the method may further comprise mixing a trialkoxy functional aminosilane into the uncured cyclic carbonate-amine resin coating composition, wherein the trialkoxy functional aminosilane has a general structure according to Formula 3:

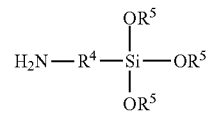

where $R^4$ may be a difunctional organic radical selected from a $(C_1-C_6)$alkyl or a $(C_1-C_6)$alkylamino$(C_1-C_6)$alkyl group and each $R^5$ is independently a $(C_1-C_6)$alkyl group. Specific embodiments of trialkoxy functional aminosilanes suited for use in the various embodiments are described in detail herein.

Coating compositions of the various embodiments described herein can be applied to a surface to be treated by conventional techniques such as spraying, dip coating, brushing or the like, and are usually applied in films of from 50 to 250 micrometers in thickness, or in some embodiments up to 2.5 millimeters in thickness, or from 1.2 to 2.5 mils in thickness, and then cured to provide the desired coating. If necessary, multiple layers of the coating composition may be applied to the surface to be protected. As described herein, in certain embodiments, the coating may be applied as a topcoat over one or more basecoats and/or primer coatings. Alternatively in specific embodiments, the coating may be applied as a topcoat directly to the surface to be coated. In certain embodiments, the one or more additional coatings may be applied on top of the cyclic carbonate-amine resin coat. In one particular embodiment, due to the improved durability, hardness and oxidation resistance of the various embodiments of the cyclic carbonate resin coating compositions described herein, the cyclic carbonate resin coating composition may be applied as a single coat directly to the surface of the article to be coated and then cured to form a one-coat coating that offers desired durability, gloss retention, and protection against oxidation and undesired mechanical damage, without the need for primer coatings, additional undercoatings, or additional topcoats. For example, for use with a wooden substrate, such as in the furniture industry, metal substrate, polymeric substrate, fiberglass or composite substrate or other conventional substrate, the coating may be applied with a dry film thickness of 75 to 125 micrometers to provide a desired degree of protection to the underlying surface. On other surface structures, coatings of appropriate thickness may be applied to provide the desired level of protection. According to still other embodiments, the cyclic carbonate-amine coating composition may be applied directly to a metal surface, such as but not limited to, a steel surface, and may act as a primer coating for additional paint or resin coats. In other embodiments, the cyclic carbonate-amine resin coating formulation may be applied as a clear coat, either directly to the substrate surface in a single coat, or as a top coat on top of one or more undercoats. The coating composition, once applied to the at least one surface of the substrate may be allowed to thermally cure, as described herein, for example, by placing the coated substrate in a drying or curing oven. Alternatively, in embodiments of the coating composition comprising a cure accelerator, such as a BCG catalyst, the coating may cure at ambient temperature until fully cured. For specific embodiments of the thermally cured substrates, the substrate may be removed from the oven after complete curing of the coating composition or after partial curing of the coating composition, after which the coating composition may continue to cure on the substrate at ambient temperature until complete cure is attained. Application and curing of the coating composition may occur in a manufacturing or coating facility. Alternatively, particularly for embodiments comprising a cure accelerator, the coating composition may be applied to the surface on site (i.e., where the surface to be coated is located) followed by curing at ambient temperature, such as by curing using the catalytic cure accelerator. In specific embodiments, the coating compositions described herein may be utilized to coat or re-coat surfaces of a substrate or article on site, for example, where the article has been delivered in an uncoated state and coating is desired or required, or when an original coat has become aged or damaged and re-coating of the article is desired or required.

These and other features of the various embodiments of the present disclosure will become more apparent upon consideration of the following examples. The various embodiments of this disclosure described in the following examples are not to be considered as limiting the invention to their details. All parts and percentages in the examples, as well as throughout this specification, are by weight unless otherwise indicated.

EXAMPLES

The following examples describe the preparation of various embodiments of the coating composition as used for coating purposes.

In these examples, exemplary cyclic carbonate-amine resin coating systems according to the present disclosure are formulated and tested for weatherability, durability, corrosion resistance and compared with comparative coating systems.

Example 1

Preparation of Cyclic Carbonate Acrylate Polymer Component

In this Example, an acrylate copolymer comprising GMA residues was converted to the cyclic carbonate acrylate polymer component having a polymeric backbone with cyclic carbonate functionality.

A 1 gallon jacketed pressure reactor having 2500 g of an acrylic resin, 58% solids (in DOWANOL™ PM, 1-methoxy-2-propanol, commercially available from Dow Chemical Company, Midland, Mich.), containing 40% glycidyl methacrylate, 35% 2-ethylhexyl methacrylate and 25% butyl methacrylate was charged into a 1 gallon jacketed pressure reactor with 36.25 g (2.5% on resin solids) TBAB catalyst and 4.35 g (0.30% on resin solids) TPP stabilizer. The reactor was then flushed 3 times with $CO_2$, sealed, and then stirred at 250 rpm and heated to 130° C. Once 130° C. was obtained, the reactor was pressurized to 50 psi using $CO_2$. After 1.5 hours, $^1$H NMR analysis indicated that 98% of the epoxy group was converted to cyclic carbonate, which increased to 100% after an additional 0.5 hour.

Example 2

Preparation of Cyclic Carbonate Acrylate Component Grind

The cyclic carbonate acrylate grind component of for the cyclic carbonate-amine resin coating was prepared as follows. A cycloaliphatic cyclic carbonate resin prepared according to Example 1 (608.1 g, (60% solids, 40% solvent) available from PPG Industries, Pittsburgh, Pa.) was weighted into a stainless steel mixing vessel and played under a Hockmeyer mixer fitted with a Cowles blade. Polymeric dispersant K-SPERSE® XD-A504 (5.4 g, commercially available from King industries, Norwalk, Conn.) and defoamer EFKA® 2720 (1.65 g, commercially available from BASF Canada, Inc., Mississauga, ON, Canada) were added to the vessel while mixing at low speed followed by addition of BYK®-088 additive (1.65 g, silicone defoamer, commercially available from BYK USA Inc., Wallingford, Conn.). The batch was then dispersed at high speed where the temperature of the mixture did not exceed 71° C. (160° F.) for 30 minutes. The batch was then cooled to 49° C. (120° F.) while stirring at slow speed. Pigments, including Naphthol Red 170 (91.7 g, commercially available from Lansco Colors, Warwick, R.I.), Red Iron Oxide (77.6 g, commercially available from Lansco Colors, Warwick, R.I.), Quindo Violet (10.9 g, commercially available from Sun Chemical, Parsippany, N.J.), and BENTONE SD®-1 (2.5 g, commercially available from Elementis Specialies, East Winsor, N.J.), are added at a rate that is sufficient to avoid agglomeration. After addition of all the pigments, the batch was mixed at high speed for 2 hr, keeping the temperature of the mixture under 71° C. (160° F.) until a 6 Hegman grind was obtained. The remaining components, including BYK® 333 (2.5 g, a polyether modified polydimethylsiloxane, commercially available from BYK USA Inc., Wallingford, Conn.) and solvents, if needed to adjust the grind solids, were added. The components of the cyclic carbonate grind along with weight and weight percent of grind are presented in Table 1.

TABLE 1

Cyclic Carbonate Resin Component Grind Formulation A

| | Ingredient | | Weights (grams) | Weight (%) of Grind |
|---|---|---|---|---|
| 1 | Acrylic functional resin | Cyclic carbonate resin (60% solids, 40% solvent) | 608.1 | 76.0% |
| 2 | K-SPERSE ® XD-A504 | Surfactant | 5.4 | 0.7% |
| 3 | EFKA ® 2720 | De-aeration additive | 1.65 | 0.2% |
| 4 | BYK ® 088 | Silicone additive | 1.65 | 0.2% |

TABLE 1-continued

Cyclic Carbonate Resin Component Grind Formulation A

| | Ingredient | | Weights (grams) | Weight (%) of Grind |
|---|---|---|---|---|
| 5 | Naphthol red | Pigment | 91.7 | 11.5% |
| 6 | Iron oxide | Pigment | 77.6 | 9.7% |
| 7 | Quidno Violet | Pigment | 10.9 | 1.4% |
| 8 | BENTONE SD ®-1 | Pigment | 2.5 | 0.3% |
| 11 | BYK ® 333 | Silicone additive | 2.5 | 0.3% |
| 12 | | Solvent | | |

Example 3

Preparation of Cyclic Carbonate-amine Resin for Thermal Cure

In this Example, a thermally curable cyclic carbonate-amine resin coating composition formulation was prepared. The coating composition was applied to a surface of a panel and thermally cured (see Example 6).

A cyclic carbonate resin prepared according to Example 1 (30.0 g, available from PPG Industries, Pittsburgh, Pa.), a HALS light stabilizer (TINUVIN® 293, 1.3 g) and a UV absorber (TINUVIN® 384-2, 1.3 g) (both of which are commercially available from BASF, Ludwigshafen, Germany) were then added to the mixture and the batch was mixed until uniform. Cyclic carbonate grind component from Example 2 (43.3 g) was then added and mixed into the batch. Mixing conditions were held for 30 minutes. The remaining components, including DC-3055 amine functional silicone resin (20.0 g, commercially available from Dow Corning, Midland, Mich.) and BYK® 361N (2.2 g, a polyacrylate leveling agent, commercially available from BYK USA Inc., Wallingford, Conn.) were added to the mixture and the batch was mixed until uniform. The components of the cyclic carbonate-amine resin coating composition are presented in Table 2.

TABLE 2

Cyclic Carbonate Resin Component (Thermal Cure)-Final Formulation

| | Ingredient | | Weight (grams) | Weight (%) Coating |
|---|---|---|---|---|
| 1 | Component A | Cyclic carbonate grind | 43.3 | 44.1% |
| 2 | TINUVIN ® 293 | HALS light stabilizer | 1.3 | 1.3% |
| 3 | TINUVIN ® 384-2 | UV absorber | 1.3 | 1.3% |
| 4 | Acrylic functional resin | Cyclic carbonate resin | 30.0 | 30.6% |
| 5 | DC-3055 | Amine functional silicone resin | 20.0 | 20.4% |
| 12 | BYK-361N | Silicone additive | 2.2 | 2.2% |

Example 4

Preparation of Cyclic Carbonate-amine Resin with Trialkoxy Aminosilane

In this Example, a curable cyclic carbonate-amine resin coating composition formulation which included a trialkoxy functional aminosilane was prepared. The coating composition was applied to a surface of a panel and cured (see Example 6).

A cyclic carbonate resin prepared according to Example 1 (30.0 g, available from PPG Industries, Pittsburgh, Pa.), a HALS light stabilizer (TINUVIN® 293, 1.3 g) and a UV absorber (TINUVIN® 384-2, 1.3 g) (both of which are commercially available from BASF, Ludwigshafen, Germany) were then added to the mixture and the batch was mixed until uniform. Cyclic carbonate grind component from Example 2 (43.3 g) was then added and mixed into the batch. Mixing conditions were held for 30 minutes. The remaining components, including DC-3055 amine functional silicone resin (20.0 g, commercially available from Dow Corning, Midland, Mich.), trialkoxy aminosilane (SILQUEST® A1110, 1.48 g, commercially available from Crompton OSi Specialties, South Charleston, W. Va.), and BYK®361N (2.2 g, a polyacrylate leveling agent, commercially available from BYK USA Inc., Wallingford, Conn.) were added to the mixture and the batch was mixed until uniform. The components of the cyclic carbonate-amine resin coating composition are presented in Table 3.

TABLE 3

Cyclic Carbonate Resin Component with Trialkoxy aminosilane-Final Formulation

| | Ingredient | | Weight (grams) | Weight (%) Coating |
|---|---|---|---|---|
| 1 | Component A | Cyclic carbonate grind | 43.3 | 44.1% |
| 2 | TINUVIN ® 293 | HALS light stabilizer | 1.3 | 1.3% |
| 3 | TINUVIN ® 384-2 | UV absorber | 1.3 | 1.3% |
| 4 | Acrylic functional resin | Cyclic carbonate resin | 30.0 | 30.6% |
| 5 | DC-3055 | Amine functional silicone resin | 20.0 | 20.4% |
| 12 | BYK-361N | Silicone additive | 2.2 | 2.2% |
| | SILQUEST ® A1110 | Trialkoxy aminosilane | 1.48 | 1.49% |

Example 5

Preparation of Cyclic Carbonate-amine Resin with BCG

In this Example, a low temperature curable cyclic carbonate-amine resin coating composition formulation was prepared. The coating composition was applied to a surface of a panel and cured at low temperature (see Example 6).

A cyclic carbonate resin prepared according to Example 1 (30.0 g, available from PPG Industries, Pittsburgh, Pa.), a HALS light stabilizer (TINUVIN® 293, 1.3 g) and a UV absorber (TINUVIN® 384-2, 1.3 g) (both of which are commercially available from BASF, Ludwigshafen, Germany) were then added to the mixture and the batch was mixed until uniform. Cyclic carbonate grind component from Example 2 (43.3 g) was then added and mixed into the batch. Mixing conditions were held for 30 minutes. The remaining components, including DC-3055 amine functional silicone resin (20.0 g, commercially available from Dow Corning, Midland, Mich.), trialkoxy aminosilane (SILQUEST® A1110, 1.48 g, commercially available from Crompton OSi Specialties, South. Charleston, W. Va.), BYK® 361N (2.2 g, a polyacrylate leveling agent, commercially available from BYK USA Inc., Wallingford, Conn.), and the bicyclic catalyst, 1,5,7-triazabicyclo[4.4.0]dec-5-ene (1.39 g, available from PPG Industries, Pittsburgh, Pa.) were added to the mixture and the batch was mixed until uniform. The components of the cyclic carbonate-amine resin coating composition are presented in Table 4.

TABLE 4

Cyclic Carbonate Resin Component (BCG)-Final Formulation

| | Ingredient | | Weight (grams) | Weight (%) Coating |
|---|---|---|---|---|
| 1 | Component A | Cyclic carbonate grind | 43.3 | 44.1% |
| 2 | TINUVIN ® 293 | HALS light stabilizer | 1.3 | 1.3% |
| 3 | TINUVIN ® 384-2 | UV absorber | 1.3 | 1.3% |
| 4 | Acrylic functional resin | Cyclic carbonate resin | 30.0 | 30.6% |
| 5 | DC-3055 | Amine functional silicone resin | 20.0 | 20.4% |
| 12 | BYK-361N | Silicone additive | 2.2 | 2.2% |
| | SILQUEST ® A1110 | Trialkoxy aminosilane | 1.48 | 1.49% |
| | Bicyclic guanidine | Cure catalyst | 1.39 | 2.13% |

Example 6

Test Results from Coated Test Panels

In this Example, a top surface of a test panel, cold rolled steel, having no primer or undercoat was coated with a cyclic carbonate-amine resin coating compositions according to Examples 3, 4 and 5. Coating thicknesses of 1.75 mil of each composition were applied to the individual test panels. The coated panels were cured (thermal cure—bake at 90° C. for 30 min; or low temperature cure—ambient temperature for 7 days) and then tested for durability (Conical mandrel—% elongation according to ASTM D522), corrosion (Salt Fog according to ASTM B 117, with measurement of face blistering (ASTM D714), face rusting (ASTM D1654), and scribe creep (ASTM D1654)), gloss retention (Accelerated weathering according to ASTM GI 55-% A SAEJ2527 Test) and methyl ethyl ketone double rub (ASTM D5402-06). The results of these tests are presented in Table 5.

TABLE 5

Coated Panels Test Results

| Coating Formulation | Example 3 (Thermal) | Example 4 (A1110) | Example 5 (BCG) |
|---|---|---|---|
| Cure | Bake at 90° C. for 30 minutes | Bake at 90° C. for 30 minutes | Ambient temperature for 7 days |
| Conical Mandrel-% Elongation ASTM D522 | Pass | Pass | Pass |
| Salt Fog, ASTM B117 | ~2 mils substrate DTM-750 hours exposure | | |
| Face Blisters, ASTM D714 | None | None | None |
| Face Rusting, ASTM D1654 | None | None | None |
| Scribe Creepage, mm, ASTM D1654 | 5-8 | 5-8 | 4 |
| Accelerated Weathering ASTM G155-5A SAEJ2527 Test | | | |
| Twenty/Sixty degree gloss-initial | 72/90 | 83/91 | 62/86 |
| After 1000 hrs. | 73/89 | | 53/82 |
| After 2500 hrs. | 63/86 | | 35/72 |
| After 5000 hrs. | 50/80 | | |
| MEK double rub ASTM D5402-06 | 90 | 90 | 180 |

Whereas particular embodiments of this invention have been described above for purposes of illustration, it will be appreciated by those skilled in the art that changes could be made to the various embodiments described herein without departing from the broad inventive concept thereof. It is understood, therefore, that this description is not limited to the particular embodiments disclosed, but is intended to cover modifications which are within the spirit and scope of the invention, as defined by the appended claims.

We claim:

1. A cyclic carbonate-amine resin coating composition comprising:
a cyclic carbonate acrylate polymer component having a polymer backbone comprising 15% to 45% by weight of a monomer unit comprising a cyclic carbonate functionality; and
an amino functional silicone resin component having a general formula:

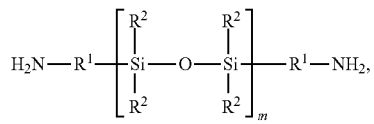

wherein each $R^1$ is a difunctional organic radical independently selected from an aryl, and alkyl, a dialkylaryl, an alkoxyalkyl, an alkylaminoalkyl, or a cycloalkyl organic radical, each $R^2$ is independently an aryl, phenyl, ($C_1$-$C_4$)alkyl, ($C_1$-$C_4$)alkoxy, or —$OSi(R^2)_2R^1NH_2$ group, and m has a value so that the amino functional silicone resin has an amine equivalent weight of 240 to 280 g/NH,
wherein the combined composition reacts to form a crosslinked cyclic carbonate-amine resin polymer.

2. The coating composition according to claim 1, wherein the amino functional silicone resin has a structure where $R^1$ is ($C_1$-$C_4$)alkyl and $R^2$ includes greater than 70% phenyl groups, less than 30% of ($C_1$-$C_4$)alkyl groups, and less than 2.0% ($C_1$-$C_4$)alkoxy groups.

3. The coating composition according to claim 2, wherein $R^2$ includes less than 0.5% of ($C_1$-$C_4$)alkoxy groups.

4. The coating composition according to claim 1, wherein the amino functional silicone resin comprises an amino functional phenyl methyl silicone resin.

5. The coating composition according to claim 1, wherein the coating composition comprises from 15% to 60% by weight of the cyclic carbonate acrylate polymer component and from 5% to 50% by weight of the amino functional silicone resin component.

6. The coating composition according to claim 1, wherein the cyclic carbonate acrylate polymer component comprises cyclic carbonate monomer units having the structure:

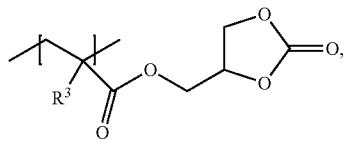

where $R^3$ is H, $CH_3$, or $CH_2CH_3$.

7. The coating composition according to claim 6, wherein the cyclic carbonate monomer unit is formed from a glycidyl (meth)acrylate monomer unit by reacting a glycidyl (meth)acrylate copolymer in the presence of $CO_2$ and 0.5 to 3.0% by weight of a tributylammonium bromide catalyst.

8. The coating composition according to claim 1, wherein the coating composition does not display yellowing upon prolonged exposure to UV light or weathering.

9. The coating composition according to claim 1, further comprising up to 5.0% by weight of a cure accelerator comprising a bicyclic guanidine catalyst.

10. The coating composition according to claim 1, further comprising 0.1% to 5.0% by weight of a trialkoxy functional aminosilane having a general structure:

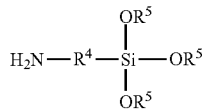

where $R^4$ is a difunctional $(C_1-C_6)$alkyl or a $(C_1-C_6)$alkylamino$(C_1-C_6)$alkyl organic radical group and each $R^5$ is independently an $(C_1-C_6)$alkyl groups.

11. The coating composition according to claim 10, wherein the trialkoxy functional aminosilane comprises aminopropyltrimethoxysilane, aminopropyltriethoxysilane, aminopropyltripropoxysilane, aminoneohexyltrimethyoxysilane, N-□-aminoethyl-□-aminopropyltrimethoxysilane, N-□-aminoethyl-□-aminopropyltriethoxysilane, N-phenylaminopropyl trimethoxysilane, trimethoxysilylpropyl diethylene triamine, 3-(3-aminophenoxy)propyl trimethoxysilane, aminoethyl aminomethyl phenyl trimethoxysilane, 2-aminoethyl-3-aminopropyl-tris-2-ethylhexoxysilane, N-aminohexyl aminopropyl trimethoxysilane, and/or trisaminopropyl trismethoxyethoxysilane.

12. A cyclic carbonate-amine resin coating composition comprising:
from 15% to 60% by weight of a cyclic carbonate acrylate polymer component having a polymer backbone comprising 15% to 45% by weight of a monomer unit comprising a cyclic carbonate functionality having the structure:

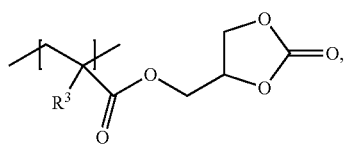

where $R^3$ is H, $CH_3$, or $CH_2CH_3$;

from 5% to 50% by weight of an amino functional silicone resin component having a general formula:

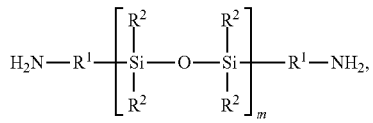

wherein each $R^1$ is a difunctional $(C_1-C_4)$alkyl radical and $R^2$ includes greater than 70% phenyl groups, less than 30% of $(C_1-C_4)$alkyl groups, and less than 2.0% $(C_1-C_4)$alkoxy groups, and m has a value so that the amino functional silicone resin has an amine equivalent weight of 240 to 280 g/NH;

from 0.0% to 5.0% by weight of a trialkoxy functional aminosilane having a general structure:

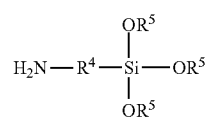

where $R^4$ is a difunctional $(C_1-C_6)$alkyl or a $(C_1-C_6)$alkylamino$(C_1-C_6)$alkyl organic radical group and each $R^5$ is independently a $(C_1-C_6)$alkyl group; and
from 0.0% to 5.0% by weight of a cure accelerator comprising a bicyclic guanidine catalyst,
wherein the combined composition reacts to form a crosslinked cyclic carbonate-amine resin polymer.

13. The coating composition according to claim 12, wherein the cyclic carbonate monomer unit is formed from a glycidyl (meth)acrylate monomer unit by reacting a glycidyl (meth)acrylate copolymer in the presence of $CO_2$ and 0.5 to 3.0% by weight of a tributylammonium bromide catalyst and the coating composition does not display yellowing upon exposure to UV light.

14. The coating composition according to claim 12, wherein the coating composition has a □b less than or equal to 0 and a □E of less than 5 upon weathering.

15. A coated substrate comprising at least one surface coated with the cyclic carbonate-amine resin coating composition according to claim 1.

16. The coated substrate of claim 15, wherein the substrate does not have a primer coating beneath the cyclic carbonate-amine resin coating composition.

17. A method for preparing a cyclic carbonate-amine resin coated surface comprising:
reacting 15% to 60% by weight of the total coating composition, of a cyclic carbonate acrylate polymer component having a polymer backbone comprising 15% to 45% by weight of a monomer unit comprising a cyclic carbonate functionality with 5% to 50% by weight of the total coating composition of an amino functional silicone resin component having a general formula:

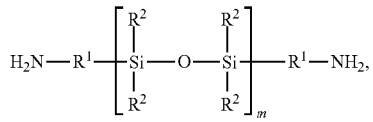

wherein each $R^1$ is a difunctional $(C_1$-$C_4)$alkyl radical and $R^2$ includes greater than 70% phenyl groups, less than 30% of $(C_1$-$C_4)$alkyl groups, and less than 2.0% $(C_1$-$C_4)$alkoxy groups, and m has a value so that the amino functional silicone resin has an amine equivalent weight of 240 to 280 g/NH, to form an uncured cyclic carbonate-amine resin coating composition;
applying the uncured cyclic carbonate-amine resin coating composition to at least a portion of a surface of a substrate; and
curing the uncured cyclic carbonate-amine resin coating composition on the substrate surface to form a cross-linked cyclic carbonate-amine resin coat.

18. The method according to claim 17, wherein curing the uncured cyclic carbonate-amine resin coating composition comprises heating the uncured cyclic carbonate-amine resin coating composition at a temperature ranging of 25° C. to 150° C. for 10 minutes to 10 hours or curing the cyclic carbonate-amine resin coating composition at ambient temperature for 1 to 10 days.

19. The method according to claim 17, wherein curing the uncured cyclic carbonate-amine resin coating composition comprises adding 0.1% to 5.0% of a cure accelerator to the uncured cyclic carbonate-amine resin coating composition.

20. The method according to claim 17, wherein the surface of the substrate does not comprise a primer coating beneath the cyclic carbonate-amine resin coat.

21. The method according to claim 17, further comprising reacting a copolymer resin comprising a glycidyl (meth)acrylate monomer units with $CO_2$ in the presence of 0.5% to 3.0% by weight of a tributylammonium bromide catalyst to form the cyclic carbonate acrylate polymer component having a polymer backbone comprising 15% to 45% by weight of a monomer unit comprising a cyclic carbonate functionality.

22. The method according to claim 17, further comprising mixing a trialkoxy functional aminosilane into the uncured cyclic carbonate-amine resin coating composition, wherein the trialkoxy functional aminosilane has a general structure:

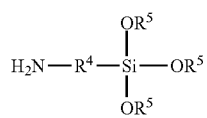

where $R^4$ is a difunctional $(C_1$-$C_6)$alkyl or a $(C_1$-$C_6)$ alkylamino$(C_1$-$C_6)$alkyl organic radical group and each $R^5$ is independently a $(C_1$-$C_6)$alkyl group.

23. The method according to claim 17, wherein the cyclic carbonate-amine resin coating composition comprises substantially no isocyanate.

24. An article comprising at least one surface coated with a coating stack comprising a cured cross-linked cyclic carbonate-amine resin polymer coating composition, wherein the cyclic carbonate-amine resin polymer coating composition comprises:

a cyclic carbonate acrylate polymer component having a polymer backbone comprising from 15% to 45% by weight of a monomer unit comprising a cyclic carbonate functionality; and
an amino functional silicone resin component having a general formula:

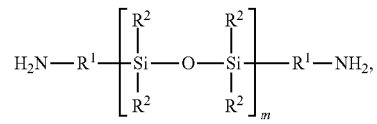

wherein each $R^1$ is independently a difunctional an aryl, an alkyl, a dialkylaryl, an alkoxyalkyl, an alkylaminoalkyl, or a cycloalkyl organic radical, each $R^2$ is independently an aryl, phenyl, $(C_1$-$C_4)$alkyl, $(C_1$-$C_4)$alkoxy, or —OSi$(R^2)_2R^1NH_2$ group, and m has a value so that the amino functional silicone resin has an amine equivalent weight of 240 to 280 g/NH,
wherein the combined composition reacts to form the cross-linked cyclic carbonate-amine resin polymer coating after applying the uncured coating composition to the surface.

25. The article according to claim 24, wherein the coating composition comprises from 15% to 60% by weight of the cyclic carbonate acrylate polymer component and from 5% to 50% by weight of the amino functional silicone resin component.

26. The article according to claim 24, wherein the amino functional silicone resin component comprises a structure where each $R^1$ is a difunctional $(C_1$-$C_4)$alkyl radical and $R^2$ includes greater than 70% phenyl groups, less than 30% of $(C_1$-$C_4)$alkyl groups, and less than 2.0% $(C_1$-$C_4)$alkoxy groups, and m has a value so that the amino functional silicone resin has an amine equivalent weight of 240 to 280 g/NH.

27. The article according to claim 24, wherein the cyclic carbonate-amine resin polymer coating composition further comprises 0.0% to 5.0% by weight of a trialkoxy functional aminosilane having a structure:

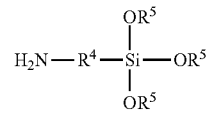

where $R^4$ is a difunctional organic radical having a structure of a $(C_1$-$C_6)$alkyl or a $(C_1$-$C_6)$alkylamino$(C_1$-$C_6)$alkyl group and each $R^5$ is independently a $(C_1$-$C_6)$alkyl group.

28. The article according to claim 24, wherein the coating stack does not include any undercoat or primer coating.

* * * * *